(12) United States Patent
Ewer

(10) Patent No.: US 7,000,750 B2
(45) Date of Patent: Feb. 21, 2006

(54) VACUUM LOCKING HUB CARTRIDGE FOR FOUR WHEEL DRIVE VEHICLE

(75) Inventor: Fred L. Ewer, Clackamas, OR (US)

(73) Assignee: Warn Industries, Inc., Milwaukie, OR (US)

( * ) Notice: Subject to any disclaimer, the term of this patent is extended or adjusted under 35 U.S.C. 154(b) by 44 days.

(21) Appl. No.: 10/745,241

(22) Filed: Dec. 22, 2003

(65) Prior Publication Data

US 2005/0133290 A1 Jun. 23, 2005

(51) Int. Cl.
*F16D 11/04* (2006.01)
(52) U.S. Cl. .................................. 192/69.41; 192/85 V
(58) Field of Classification Search ......... 180/244–247
See application file for complete search history.

(56) References Cited

U.S. PATENT DOCUMENTS

| | | | |
|---|---|---|---|
| 4,625,846 A * | 12/1986 | Gomez | 192/69.41 |
| 5,353,890 A | 10/1994 | Clohessy | 180/247 |
| 5,445,258 A | 8/1995 | Bigley et al. | 192/85 V |
| 5,520,272 A | 5/1996 | Ewer et al. | 192/36 |
| 5,535,869 A | 7/1996 | Bigley et al. | 192/69.41 |
| 5,586,632 A * | 12/1996 | Bigley et al. | 192/69.41 |
| 5,806,623 A | 9/1998 | Clohessy | 180/247 |
| 5,908,080 A | 6/1999 | Bigley et al. | 180/247 |
| 6,234,289 B1 * | 5/2001 | Baker et al. | 192/69.41 |

* cited by examiner

*Primary Examiner*—Lesley D. Morris
*Assistant Examiner*—L. Lum
(74) *Attorney, Agent, or Firm*—Harness, Dickey & Pierce, P.L.C.

(57) ABSTRACT

A vacuum locking hub system is provided for a four-wheel drive vehicle that includes a cartridge-type assembly that allows the vacuum locking hub system to be inserted into the wheel as a cartridge unit for ease of assembly. The vacuum locking hub system has a compact construction allowing it to be substantially received within the wheel hub, thus reducing system mass and unit length.

9 Claims, 2 Drawing Sheets

VACUUM LOCKING HUB CARTRIDGE FOR FOUR WHEEL DRIVE VEHICLE

FIELD OF THE INVENTION

The present invention relates to a locking hub system for a vehicle, and more particularly to a vacuum actuated locking hub cartridge with reduced assembly length and improved assembly, installation and sealing capabilities.

BACKGROUND AND SUMMARY OF THE INVENTION

Vehicles having four-wheel drive capabilities that are designed for on-road and off-road use typically provide optional engagement/disengagement of two of the four wheels. The wheels to be disengaged are necessarily provided with a driveline from the vehicle powertrain wherein for on-road use and to avoid unnecessary energy consumption and wearing of the out-of-service driveline components, hub locks are provided for disconnecting the axles from the wheels of the vehicle. The original hub lock devices were manually actuated. A driver/operator would stop the vehicle, engage the transfer case disconnect system and then manually turn a dial located in each wheel hub to activate the hub lock to disconnect the wheels from the axles.

Subsequently, mechanisms have been developed to automatically activate the hub locks. Automatic locking hubs for four-wheel drive vehicles are now available in many different design configurations. Such configurations include direct manual clutch engagement, remote vacuum clutch engagement, and remote pressure clutch engagement. The systems of the previous designs include complex designs requiring numerous parts involved that render the device expensive to produce and/or are complex to assemble. The present invention requires fewer parts for more efficient production, a more compact package of components for easier assembly to the vehicle, and reduced unsprung mass.

The vacuum locking hub assembly of the present invention includes a body member having an annular base portion secured to an inner drive gear. The inner drive gear includes internal splines in engagement with the external splines of the axle shaft and a plurality of exterior clutch teeth. A clutch ring surrounds the inner drive gear and includes internal clutch teeth with the clutch ring being slidable relative to the inner drive gear for moving the internal clutch teeth into and out of engagement with the exterior clutch teeth of the inner drive gear. A piston is received in the body member and is disposed against the clutch ring for causing driving movement of the clutch ring. A diaphragm is attached to the body member by a retainer and acts against the piston for driving the piston. The inner drive gear, clutch ring, piston, and diaphragm are all held together by the body member as a cartridge unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
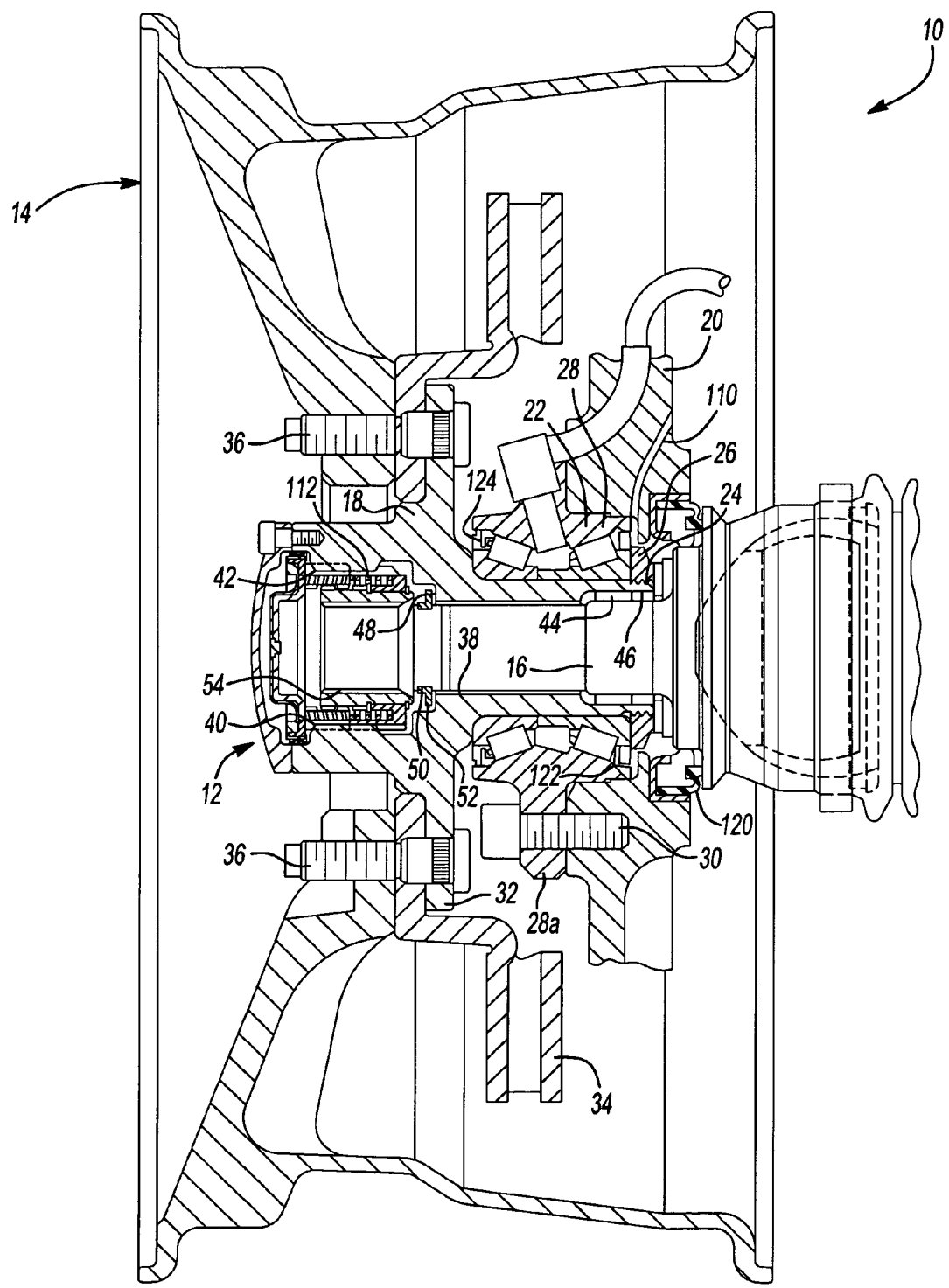
FIG. 1 is a cross-sectional view of a vacuum actuated hub clutch mechanism applied to a spindle according to the principles of the present invention.

With reference to FIG. 1, a wheel hub assembly 10 is shown including a vacuum locking hub system 12 that couples a wheel 14 to the axle shaft 16. The wheel 14 is fixedly mounted to a wheel hub 18 which is rotatably supported on the axle shaft 16. It will be understood that the axle 16 and wheel hub 18 can be coupled or uncoupled to one another by the vacuum locking hub system 12.

Figure 2:
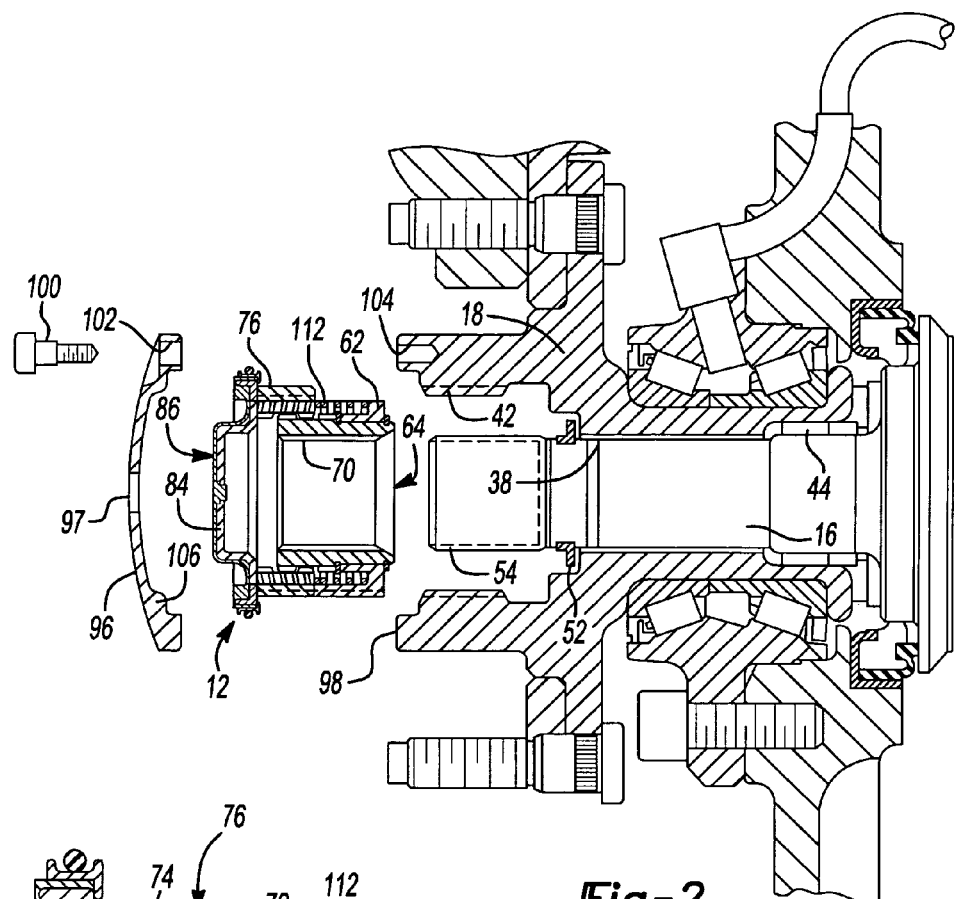
FIG. 2 is an exploded sectional view illustrating the assembly of the vacuum actuated hub clutch mechanism according to the principles of the present invention.

The wheel hub 18 is supported by a knuckle 20. A bearing assembly 22 is disposed between knuckle 20 and wheel hub 18. Wheel hub 18 includes an inboard end portion 24 which receives either a bearing adjusting nut 26 (as shown in FIG. 1) which is disposed against the bearing assembly 22 or a roll form retention system (as shown in FIG. 2). The bearing assembly 22 includes an outer race portion 28 having an outwardly extending flange portion 28A that is fastened to the knuckle 20 by fasteners 30.

The wheel hub 18 includes a radially extending flange portion 32 to which a brake rotor 34 and wheel 14 are fastened by fasteners 36. The wheel hub 18 includes a bore 38 extending therethrough for receiving the axle shaft 16 therein. The bore 38 includes an outboard portion 40 having internal splines 42. A bearing assembly 44 is provided on an inboard end 46 of the bore 38 between the axle shaft 16 and wheel hub 18. The bore 38 includes a shoulder portion 48 and the axle shaft 16 includes a recessed groove 50 which receives an axle retaining ring 52 which abuts against the shoulder 48 of the bore 38 for retaining the axle shaft 16 in the bore 38. The axle shaft 16 includes external splines 54 on an outboard end thereof.

Figure 3:
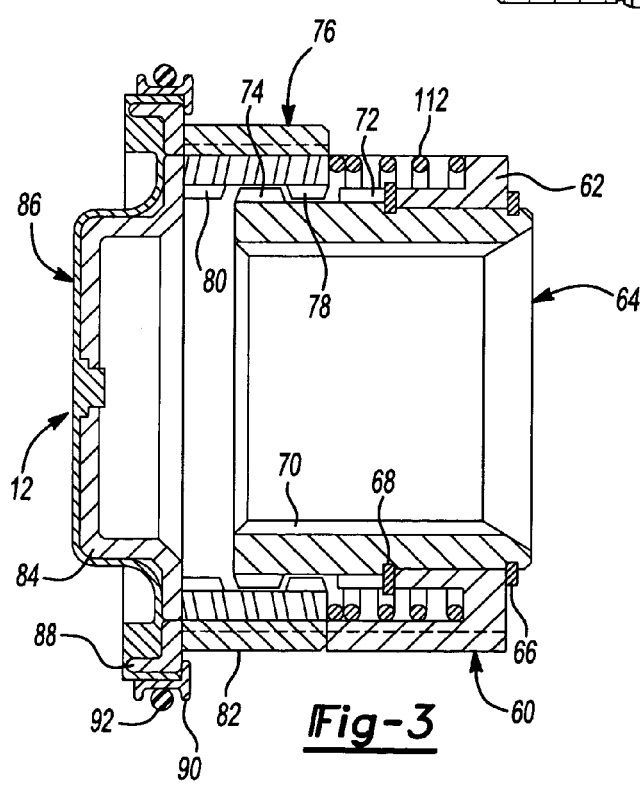
FIG. 3 is a detailed cross-sectional view of the vacuum actuated hub clutch mechanism according to the principles of the present invention.

The vacuum locking hub system 12 is provided as a cartridge unit that is inserted in the outboard end 40 of bore 38. The vacuum locking hub system 12, as best illustrated in FIG. 3, includes a body member 60 which holds the vacuum locking hub system 12 together as a cartridge unit. The body member 60 includes an annular base portion 62 which is secured to an inner drive gear 64 by a rear retaining ring 66 and an outboard washer 68. The inner drive gear 64 includes internal splines 70 which engage the external splines 54 on the outboard end of axle shaft 16. The inner drive gear 64 further includes two sets of axially spaced exterior clutch teeth 72, 74. A clutch ring 76 is disposed around the inner drive gear 64 and includes two sets of interior axially spaced clutch teeth 78, 80. The axially spaced interior clutch teeth 78, 80 of clutch ring 76 are engagable with the exterior axially spaced clutch teeth 72, 74 on the inner drive gear 64. The clutch ring 76 includes exterior splines 82 which are engaged with the interior splines 42 provided in the outboard end 40 of the bore 38 of wheel hub 18.

Figure 4:
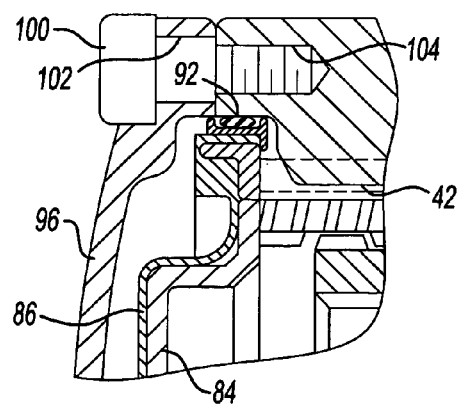
FIG. 4 is a detailed cross-sectional view of the seal arrangement for the vacuum actuated hub clutch mechanism according to the principles of the present invention.

A piston 84 is axially movable inside body member 60 and is disposed directly against the clutch ring 76. A diaphragm 86 is supported by the body member 60 and disposed against the piston 84. The diaphragm 86 is secured to a radially outwardly extending flange portion 88 of the body member 60, by a metal retainer 90 that pinches an outer flange of the diaphragm 86 against the flange portion 88 of body member 60. An O-ring seal 92 is provided around the retaining ring 90 for providing a seal between the outer flange 88 of body member 60 and the bore 38 of wheel hub 18, as best shown in FIG. 4. A cap 96 is mounted to an end face 98 of the wheel hub 18 by threaded fasteners 100 which are received in holes 102 provided in the cap 96 and threaded bores 104 provided in the end face 98 of the wheel hub 18. The cap 96 includes a shoulder portion 106 (best shown in FIG. 2) which presses against the flange portion 88 of body member 60 for securing the vacuum locking hub system 12 within the bore 38 of wheel hub 18. A vent 97 is preferably provided in the cap 96 to prevent negative pressure build up between the diaphragm assembly 86 and the cap 96.

In operation, a vacuum passage 110 is provided in the knuckle 20 for communicating a vacuum between the axle shaft 16 and wheel hub 18 to the vacuum locking hub system 12 to cause the diaphragm 86 to move axially inward, thus causing the piston 84 to move inward for pushing clutch ring 76 such that internal clutch teeth sets 78, 80 engage with external clutch teeth sets 72, 74 of inner drive gear 64 for providing a driving connection between the spindle 16 and wheel hub 18. A spring 112 is supported by the body 60 and biases clutch ring 76 to a disengaged position when the vacuum is discontinued.

The body 60 holds all of the components of the vacuum locking hub system 12 together as a cartridge to be installed as a unit into the wheel hubs 18. An assembler slides the vacuum locking hub cartridge 12 into the wheel end bore 38 by aligning the internal splines 70 of inner drive gear 64 with external splines 54 of axle shaft 16. Then, the assembler aligns the external splines 82 of the clutch ring 76 with the internal splines 42 of wheel hub 18. The cap 96 is then placed on the wheel hub 18 and mounting screws 100 are installed. The O-ring seal 92 is trapped between the vacuum locking hub cartridge 12 and the bore 38 of the wheel hub 18. The O-ring seal 92 holds the vacuum and prevents contamination from entering the wheel end. A seal 120 is provided between the knuckle 20 and axle shaft 60 (FIG. 1) while additional seals 122, 124 on opposite ends of the bearing assembly 22 further prohibit escape of vacuum pressure from the vacuum chamber.

With the vacuum locking hub cartridge 12, according to the present invention, the cartridge 12 is very easily assembled on the wheel end. In addition, the compact construction of the vacuum locking hub cartridge 12 allows it to be substantially received within the bore 38 of the locking hub 18 thereby reducing the size and weight of the locking hub system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hub lock system, comprising:
   a knuckle adapted to be fixed to a vehicle;
   a wheel hub rotatably supported by said knuckle, said wheel hub including a bore extending therethrough defining interior splines;
   an axle shaft extending through said bore of said wheel hub, said axle shaft including exterior splines thereon; and
   a vacuum locking hub assembly received in said bore in said wheel hub and including:
   a body member having an annular base portion secured to an inner drive gear,
   said inner drive gear including internal splines in engagement with said external splines of said axle shaft and a plurality of exterior clutch teeth,
   a clutch ring surrounding said inner drive gear and including internal clutch teeth, said clutch ring being slidable relative to said inner drive gear for moving said internal clutch teeth into and out of engagement with said exterior clutch teeth of said inner drive gear;
   a piston received in said body member and disposed against said clutch ring for causing driving movement of said clutch ring;
   a diaphragm attached to said body member by a retainer, said diaphragm acting against said piston for driving said piston, wherein said inner drive gear, said clutch ring, said piston and said diaphragm are all held together by said body member;
   a cap member separate from said vacuum locking hub assembly and secured to an end face of said wheel hub for securing said vacuum locking hub assembly within said bore of said wheel hub.

2. The hub lock system according to claim 1, further comprising a seal member disposed between said body member and said bore of said wheel hub.

3. The hub lock system according to claim 2, wherein said seal member is received on said retainer.

4. The hub lock system according to claim 1, further comprising a spring disposed between said base portion of said body member and said clutch ring for biasing said clutch ring to a disengaged position relative to said exterior clutch teeth of said inner drive gear.

5. The hub lock system according to claim 1, wherein said piston is pressed directly against said clutch ring.

6. The hub lock system according to claim 1, wherein said retainer secures said diaphragm against an outer surface of said body member.

7. The hub lock system according to claim 1, wherein a vacuum passage is provided between said wheel hub and said axle shaft.

8. A hub lock system, comprising:
   a knuckle adapted to be fixed to a vehicle;
   a wheel hub rotatably supported by said knuckle, said wheel hub including a bore extending therethrough defining interior splines;
   an axle shaft extending through said bore of said wheel hub, said axle shaft including exterior splines thereon; and
   a vacuum locking hub assembly received in said bore in said wheel hub and including:
   a body member having an annular base portion secured to an inner drive gear,
   said inner drive gear including internal spline in engagement with said external applies of said axle shaft and a plurality of exterior clutch teeth,
   a clutch ring surrounding said inner drive gear and including internal clutch teeth, said clutch ring being slidable relative to said inner drive gear for moving said internal clutch teeth into and out of engagement with said exterior clutch teeth of said inner drive gear;
   a piston received in said body member and disposed against said clutch ring for causing driving movement of said clutch ring;
   a diaphragm ached to said body member by a retainer, said diaphragm acting against said piston for driving said piston, wherein said inner drive gear, said clutch ring, said piston and said diaphragm are all held together by said body member; and a seal member received on said retainer and sealingly disposed between said retainer and said bore of said wheel hub.

9. A hub lock system, comprising:

a knuckle adapted to be fixed to a vehicle;

a wheel hub rotatably supported by said knuckle, said wheel hub including a bore extending therethrough defining interior splines;

an axle shaft extending through said bore of said wheel hub, said axle shaft including exterior splines thereon; and a vacuum locking hub assembly received in said bore in said wheel hub and including:

a body member having an annular base portion secured to an inner drive gear, said inner drive gear including internal splines in engagement with said external splines of said axle shaft and a plurality of exterior clutch teeth, a clutch ring surrounding said inner drive gear and including internal clutch teeth, said clutch ring being slidable relative to said inner drive gear for moving said internal clutch teeth into and out of engagement with said exterior clutch teeth of said inner drive gear, said clutch ring including extension splines that directly engage said interior splines of said wheel hub;

a piston received in said body member and disposed directly against said clutch ring for causing driving movement of said clutch ring;

a diaphragm attached to said body member by a retainer, said diaphragm acting against said piston for driving said piston, wherein said inner drive gear, said clutch ring, said piston and said diaphragm are all held together by said body member.

* * * * *

UNITED STATES PATENT AND TRADEMARK OFFICE
CERTIFICATE OF CORRECTION

PATENT NO. : 7,000,750 B2
DATED : February 21, 2006
INVENTOR(S) : Fred L. Ewer

It is certified that error appears in the above-identified patent and that said Letters Patent is hereby corrected as shown below:

Column 4,
Line 53, delete "applies" insert -- splines --.
Line 63, delete "ached" insert -- attached --.

Signed and Sealed this

Thirtieth Day of May, 2006

JON W. DUDAS
*Director of the United States Patent and Trademark Office*